U. S. MEEKS.
REFRIGERATOR.
APPLICATION FILED AUG. 19, 1910.
984,835.
Patented Feb. 21, 1911.
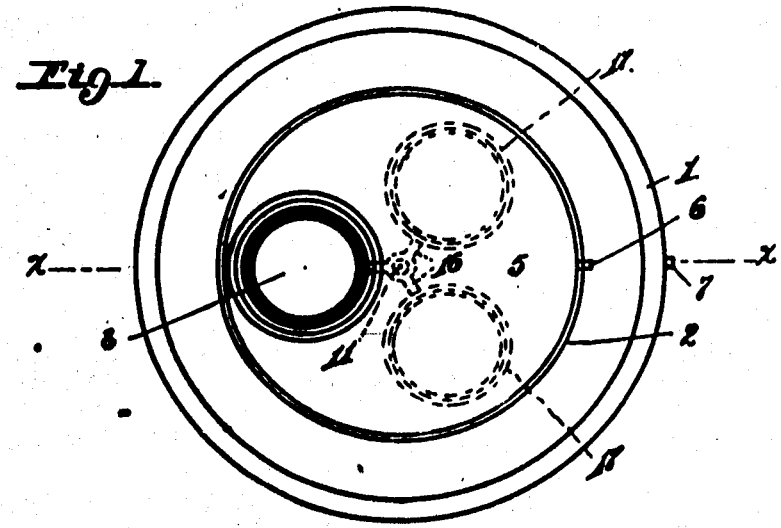
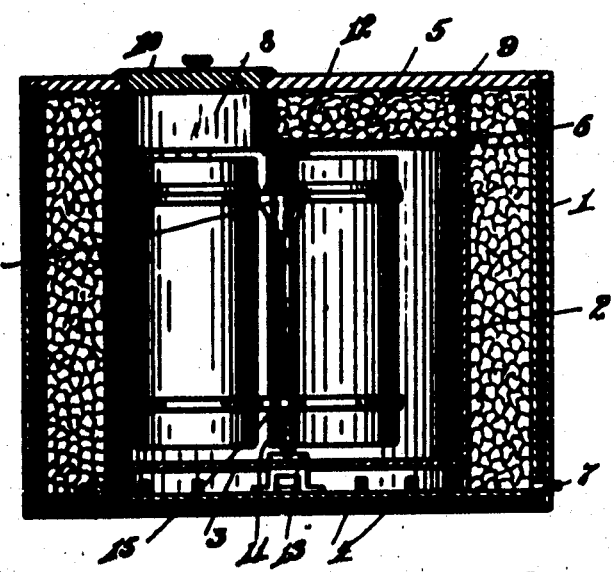
Witnesses:
Ulysses S. Meeks.
Inventor.
By George J. Oltsch
Attorney

UNITED STATES PATENT OFFICE.

ULYSSES S. MEEKS, OF SOUTH BEND, INDIANA, ASSIGNOR OF ONE-HALF TO DELLANO O. KINGSLEY, OF SOUTH BEND, INDIANA.

REFRIGERATOR.

984,833.  Specification of Letters Patent.  Patented Feb. 21, 1911.

Application filed August 29, 1910. Serial No. 579,509.

*To all whom it may concern:*

Be it known that I, ULYSSES S. MEEKS, a citizen of the United States, residing at South Bend, in the county of St. Joseph and State of Indiana, have invented certain new and useful Improvements in Refrigerators, of which the following is a specification.

My invention relates to improvements in refrigerators, and the object of the present invention is to increase the cooling efficiency of cabinets used for storing ice cream and other frozen viands, which require a low temperature where the containers for the cream are not brought in direct contact with the refrigerant.

Another object of the invention resides in the provision of means for obtaining a cold dry air in a storage chamber, and for a more even distribution of the refrigerant around the chamber, so that the same will be almost completely enveloped by the refrigerant and, unlike the ordinary cabinet in which the brine all gravitates to the bottom and sides of the cooling chamber, leaving the upper end and sides thereof fully exposed as the ice melts, the brine is held upon the top of the chamber, so as to obtain refrigeration at that point long after the ice has disappeared.

A further object of the invention resides in the provision of a revoluble bracket adapted to receive and hold the cans containing the cream suspended, so that the particular can from which it is desired to remove cream may be easily brought in line with the opening into the chamber. This arrangement requires the opening to be sufficiently large enough only to permit a cream can to be passed into the chamber, the advantage of which resides in the increased space remaining on the top of the chamber for the refrigerant.

With these and other objects in view, the invention consists of certain novel features of construction, as hereinafter described and pointed out in the claims.

Figure 1 is a top view of the cabinet, with the cover removed therefrom. Fig. 2 is a vertical sectional view taken on a line *x—x* of Fig. 1, with the cover in position upon the cabinet.

The cabinet comprises a cylindrical outer casing 1, which is built up and provided with non-conducting material in its walls, to prevent absorption of heat therethrough by the freezing medium, which for the present purpose preferably consists of ice and salt and the solution of both, commonly known as brine. The upper end of the casing is entirely open, so as to render the interior thereof easily accessible for repairing the metal lining thereof, or for replacing the same when worn. Centrally disposed within the casing is a metallic cylindrical casing 2, sufficiently smaller in diameter so as to leave a considerable intervening space between the same and the outer casing for the reception of the refrigerant. The bottom 3, of the inner casing, is raised above the lower edge thereof so as to provide an open space thereunder, a plurality of openings 4, affording communication between the same and the space on the side of the cylinder, so that the brine can enter therethrough. The side wall of the inner casing extends upwardly beyond the top thereof, so as to form a receptacle thereon 5, in which ice and salt is packed, and the brine resulting from the melting of the ice and salt remains therein, instead of flowing to the bottom of the cabinet. The advantage of this is clearly apparent, as the brine has refrigerating properties long after the ice has disappeared, thus keeping the refrigerant more evenly distributed, as there will be brine on top of, beneath and around the chamber. The receptacle is provided with a drain at 6, which permits the brine to empty into the bottom of the cabinet, which in turn has a drain at 7.

Communication with the inner casing is had through an opening 8, which is preferably of a size just sufficient to permit the cans containing the cream to pass therethrough, so as to obtain correspondingly greater capacity for the receptacle 5. The upper end of the opening is on a level with the upper end of the inner casing, so that the brine in the top receptacle may not overflow into the casing. A cover 9 rests upon the upper edges of the outer casing, the inner casing and wall of the opening, thus effecting a tight closure and permitting access to be had to the storage chamber without exposing the refrigerant to the atmosphere, the cover having an opening therein coincident with the opening into the inner casing, and a lid 10 for closing the same.

In order to permit the contents of the storage chamber to be brought within reach, owing to the relatively small opening communicating therewith, I provide a vertical shaft 11, which has its ends suitably journaled in bearings 12 and 13, and to which shaft brackets 14 and 15 are fastened, and having radially extending arms 16, supporting ring members 17 at their ends. The ring members are of a size sufficient to permit the body of an ice cream can to pass therethrough, with the annular rib, with which all cream cans are supplied, resting on the upper ring and holding same suspended, the lower rings holding the cans against swinging. As the shaft and its brackets are mounted for rotation, any one of the cans may be easily moved so as to be in line with the opening into the chamber.

Having thus described my invention, what is claimed is:—

1. In a refrigerator, the combination with the outer casing, of an inner casing spaced therefrom, and having its side wall extending above the top side thereof to form a receptacle, means permitting the draining of the receptacle, an upwardly extending flange forming an opening into the inner casing, and revoluble means within the inner casing to support the stored contents and permit same to be moved into a position below said opening.

2. In a refrigerator, the combination with the outer casing, of an inner casing spaced therefrom, and having its side wall extending above the top side thereof to form a receptacle, means permitting the draining of the receptacle, an upwardly extending flange forming an opening into the inner casing, and shiftable means within the inner casing to support the stored contents and permit same to be moved into a position below said opening.

In testimony whereof I affix my signature, in presence of two witnesses.

ULYSSES S. MEEKS.

Witnesses:
L. M. HAMMERSCHMID,
GEORGE OLTSCH.